United States Patent
Parij et al.

(10) Patent No.: US 12,213,217 B2
(45) Date of Patent: Jan. 28, 2025

(54) SYSTEM FOR PREVENTING OVERHEATING ARCING IN HEATED LAMINATED GLASS

(71) Applicant: GM GLOBAL TECHNOLOGY OPERATIONS LLC, Detroit, MI (US)

(72) Inventors: Gerard Parij, Warren, MI (US); David G. Meller, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 719 days.

(21) Appl. No.: 17/410,839

(22) Filed: Aug. 24, 2021

(65) Prior Publication Data

US 2023/0066940 A1    Mar. 2, 2023

(51) Int. Cl.
| | |
|---|---|
| *H05B 3/86* | (2006.01) |
| *B32B 17/10* | (2006.01) |
| *H05B 1/02* | (2006.01) |
| *H05B 3/03* | (2006.01) |

(52) U.S. Cl.
CPC ......... *H05B 3/86* (2013.01); *B32B 17/10036* (2013.01); *B32B 17/1022* (2013.01); *B32B 17/10293* (2013.01); *B32B 17/10743* (2013.01); *B32B 17/10761* (2013.01); *B32B 17/10779* (2013.01); *B32B 17/10899* (2013.01); *H05B 1/0236* (2013.01); *H05B 3/03* (2013.01); *B32B 2307/202* (2013.01); *B32B 2307/54* (2013.01); *H05B 2203/011* (2013.01); *H05B 2203/013* (2013.01); *H05B 2203/016* (2013.01); *H05B 2203/017* (2013.01)

(58) Field of Classification Search
CPC . H05B 3/86; B32B 17/10036; B32B 17/1022; B32B 17/10293; B32B 17/1073
USPC .......................................................... 219/203
See application file for complete search history.

(56) References Cited

U.S. PATENT DOCUMENTS

| | | | | |
|---|---|---|---|---|
| 5,824,994 A | * | 10/1998 | Noda | H05B 3/84 |
| | | | | 219/541 |
| 10,149,349 B2 | * | 12/2018 | Baba | H05B 3/20 |

\* cited by examiner

*Primary Examiner* — Nathaniel E Wiehe
*Assistant Examiner* — Thomas J Ward

(57) ABSTRACT

A system includes a laminated glass comprising a protective layer disposed between two sheets of glass. The system includes a resistive conductive coating made of a first electrically conducting material disposed on a surface of one of the two sheets of glass facing the protective layer. The system includes a first set of electrodes made of a second electrically conducting material disposed on the resistive conductive coating. The system includes a second set of electrodes made of a third electrically conducting material disposed on the first set of electrodes. The second set of electrodes is electrically connected to the first set of electrodes, respectively. The third electrically conducting material of the second set of electrodes is more ductile than the second electrically conducting material of the first set of electrodes.

15 Claims, 10 Drawing Sheets

SYSTEM FOR PREVENTING OVERHEATING ARCING IN HEATED LAMINATED GLASS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for preventing overheating and arcing in heated laminated glass.

Windshields of vehicles use a laminated glass construction. Back glass (i.e., glass used in rear windows) of vehicles can also sometimes use a laminated glass. Further, any side, quarter, or door glass locations can also use a laminated glass. The laminated glass typically includes a protective interlayer made of polyvinyl butyral (PVB) that is bonded together between two sheets of glass under heat and pressure. PVB is a resin mostly used in applications that require strong binding, optical clarity, adhesion to other surfaces, toughness, and flexibility. PVB is prepared from polyvinyl alcohol by reaction with butyraldehyde. An example of the applications in which PVB is used includes laminated safety glass used in windshields and back glass of vehicles. Accordingly, the laminated glass with the PVB interlayer is called a safety glass or laminated glass with a protective layer (e.g., the PVB interlayer). Other materials like ethylene-vinyl acetate, ethylene-methacrylic acid, polyethylene terephthalate or any combination(s) thereof can also be used as the protective layer.

Heating systems are often embedded in the laminated glass (e.g., windshield and/or in the back glass). The heating systems include a heating element constructed of a coating, layer, film, or an appropriate conductive substrate that is similarly deposited or bonded. The heating element includes a conductive coating on one of the inner facing glass surfaces in vehicles for defogging and defrosting purposes. The conductive coating would be on surface 2 or surface 3 of a glass assembly stack. Surfaces of a laminated stack are identified as follows. Of the first glass layer of the laminated stack, the outside facing glass surface is surface one. The inside of first glass layer touching the PVB layer is surface two. Of the second glass layer of the laminated stack, the side touching the PVB is surface three, and the side facing the inside of the vehicle is surface four. The heating systems include a circuit comprising two bus bars (or electrodes) and surface heating element (i.e., the conductive coating, also called the resistive conductive coating) connected between the bus bars. The bus bars are arranged opposite each other in a horizontal or vertical orientation. The bus bars are typically formed by printing and baking a paste of an electrically conductive material (e.g., silver-ceramic material) on the conductive coating. When power is supplied to the bus bars, the resistive conductive coating generates heat. The heat thaws ice and evaporates condensation from the laminated glass.

SUMMARY

A system comprises a laminated glass comprising a protective layer disposed between two sheets of glass. The system comprises a resistive conductive coating made of a first electrically conducting material disposed on a surface of one of the two sheets of glass facing the protective layer. The system comprises a first set of electrodes made of a second electrically conducting material disposed on the resistive conductive coating. The system comprises a second set of electrodes made of a third electrically conducting material disposed on the first set of electrodes. The second set of electrodes is electrically connected to the first set of electrodes, respectively. The third electrically conducting material of the second set of electrodes is more ductile than the second electrically conducting material of the first set of electrodes.

In other features, the system further comprises a loop made of a fourth electrically conducting material disposed on the one of the two sheets of glass facing the protective layer. The loop surrounds the first and second sets of electrodes and the resistive conductive coating.

In other features, the system further comprises a heating circuit configured to supply power to the first set of electrodes. The resistive conductive coating generates heat based on the power supplied to the first set of electrodes.

In other features, the system further comprises a heating circuit configured to supply power to the first set of electrodes. At least one of the second set of electrodes supplies the power to the resistive conductive coating in response to at least one of the first set of electrodes being severed by a crack in the laminated glass.

In other features, the system further comprises a controller configured to supply power to the first set of electrodes. The resistive conductive coating generates heat based on the power supplied to the first set of electrodes. The controller is configured to detect a discontinuity in the loop caused by a crack in the laminated glass and discontinue the supply of the power in response to detecting the discontinuity in the loop caused by the crack.

In other features, the second set of electrodes has a lower Young's modulus than the first set of electrodes.

In other features, the first set of electrodes is printed and baked on the resistive conductive coating, and the second set of electrodes is soldered on the first set of electrodes, respectively.

In other features, the first set of electrodes is printed and baked on the resistive conductive coating. The loop is printed and baked on the one of the two sheets of glass. The second set of electrodes is soldered on the first set of electrodes, respectively.

In other features, the system further comprises a cover layer that covers the first and second sets of electrodes and the resistive conductive coating.

In other features, the system further comprises a cover layer that covers the first and second sets of electrodes, the resistive conductive coating, and the loop.

In other features, the protective layer is made of a material selected from a group consisting of polyvinyl butyral, ethylene-vinyl acetate, ethylene-methacrylic acid, polyethylene terephthalate, or any combination thereof.

In other features, the first set of electrodes and the loop are made of a different material than the resistive conductive coating.

In still other features, a method comprises disposing a resistive conductive coating made of a first electrically conducting material on a surface of one of two sheets of glass of a laminated glass, the surface facing a protective layer disposed between the two sheets of glass. The method comprises disposing a first set of electrodes made of a second electrically conducting material on the resistive conductive coating. The method comprises disposing a second set of electrodes made of a third electrically conducting material on the first set of electrodes, respectively, the third electrically conducting material being more ductile than the second electrically conducting material. The method comprises electrically connecting the second set of electrodes to the first set of electrodes, respectively.

In other features, the method further comprises disposing a loop made of a fourth electrically conducting material on the one of the two sheets of glass facing the protective layer. The loop surrounds the first and second sets of electrodes and the resistive conductive coating.

In other features, the method further comprises supplying power to the first set of electrodes. The resistive conductive coating generates heat based on the power supplied to the first set of electrodes.

In other features, the method further comprises supplying power to the first set of electrodes. At least one of the second set of electrodes supplies the power to the resistive conductive coating in response to at least one of the first set of electrodes being severed by a crack in the laminated glass.

In other features, the method further comprises supplying power to the first set of electrodes. The resistive conductive coating generates heat based on the power supplied to the first set of electrodes. The method further comprises detecting a discontinuity in the loop caused by a crack in the laminated glass and discontinuing the supply of the power in response to detecting the discontinuity in the loop caused by the crack.

In other features, the method further comprises printing and baking the first set of electrodes on the resistive conductive coating. The method further comprises printing and baking the loop on the one of the two sheets of glass. The method further comprises soldering the second set of electrodes on the first set of electrodes, respectively.

In other features, the method further comprises disposing a cover layer that layer covers the first and second sets of electrodes, the resistive conductive coating, and the loop.

In other features, the second set of electrodes has a lower Young's modulus than the first set of electrodes. The protective layer is made of a material selected from a group consisting of polyvinyl butyral, ethylene-vinyl acetate, ethylene-methacrylic acid, polyethylene terephthalate, or any combination thereof.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
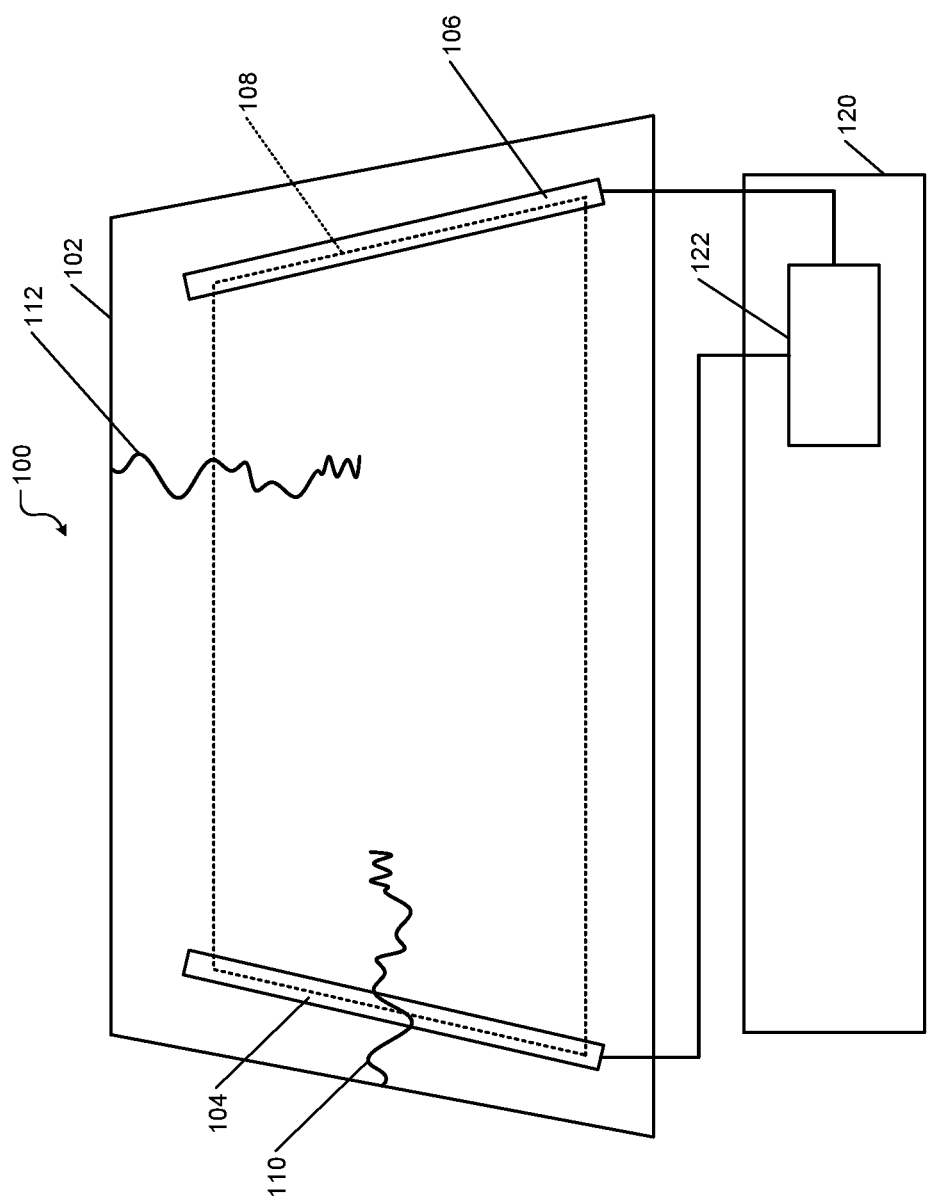
FIGS. 1 and 2 show examples of a glass heating system comprising a laminated glass including a pair of bus bars (hereinafter called primary bus bars) and a resistive conductive coating connected to the primary bus bars.

A laminated glass typically comprises a heating system including a pair of bus bars (hereinafter called primary bus bars) and a resistive conductive coating connected to the primary bus bars. The primary bus bars and the resistive conductive coating are formed by printing and baking a paste of an electrically conductive material (e.g., silver-ceramic material) on the inner surface of the laminated glass directly to the coated glass. The laminated glass can develop cracks. For example, the cracks can develop due to shock from an object hitting the laminated glass. The electrically conductive material is brittle. Consequently, the cracks can often sever one or both primary bus bars and/or the resistive conductive coating and can cause a discontinuity in the circuit. Subsequently, when power is applied to the circuit, the discontinuity can cause arcing. The arcing can generate an abnormal amount of heat around the discontinuity, which can damage the PVB interlayer.

The present disclosure solves the arcing problem by soldering a foil of a ductile material onto the printed bus bars in the circuit. The foils function as secondary bus bars, with the printed bus bars being the primary bus bars. The foils can be made of a metallic material (e.g., aluminum or tin coated copper) that is more ductile than the printed bus bars. Consequently, while the printed bus bars may be severed due to a crack in the laminated glass, the secondary bus bars made of the ductile material are not severed by the crack in the laminated glass. A secondary bus bar provides an alternate path for current to flow when a crack in the laminated glass severs a printed primary bus bar and creates a discontinuity in the circuit. The secondary bus bar provides the alternate path for the current to flow through the resistive conductive coating and prevents the crack in the laminated glass from causing a discontinuity in the circuit, which eliminates arcing.

Additionally, the present disclosure provides a current loop bonded to the glass. The current loop surrounds the circuit comprising the primary and secondary bus bars and the resistive conductive coating on all sides or periphery of the laminated glass. The current loop includes a single conductor printed around the circuit using the same material and the same printing and baking processes used for the primary bus bars and the resistive conductive coating. The current loop is isolated or is not in contact with the conductive coating or any of the primary and secondary bus bars. When the laminated glass cracks anywhere, the crack breaks (i.e., severs) the current loop. A discontinuity in the current loop is detected by a circuit that supplies power to the current loop. On detecting the discontinuity in the current loop, the circuit comprising the primary and secondary bus bars and the resistive conductive coating (i.e., the heating system) can be disabled (e.g., by disconnecting power supply to the primary and secondary bus bars and the resistive conductive coating). These and other features of the present disclosure are described below in detail.

Figure 2:
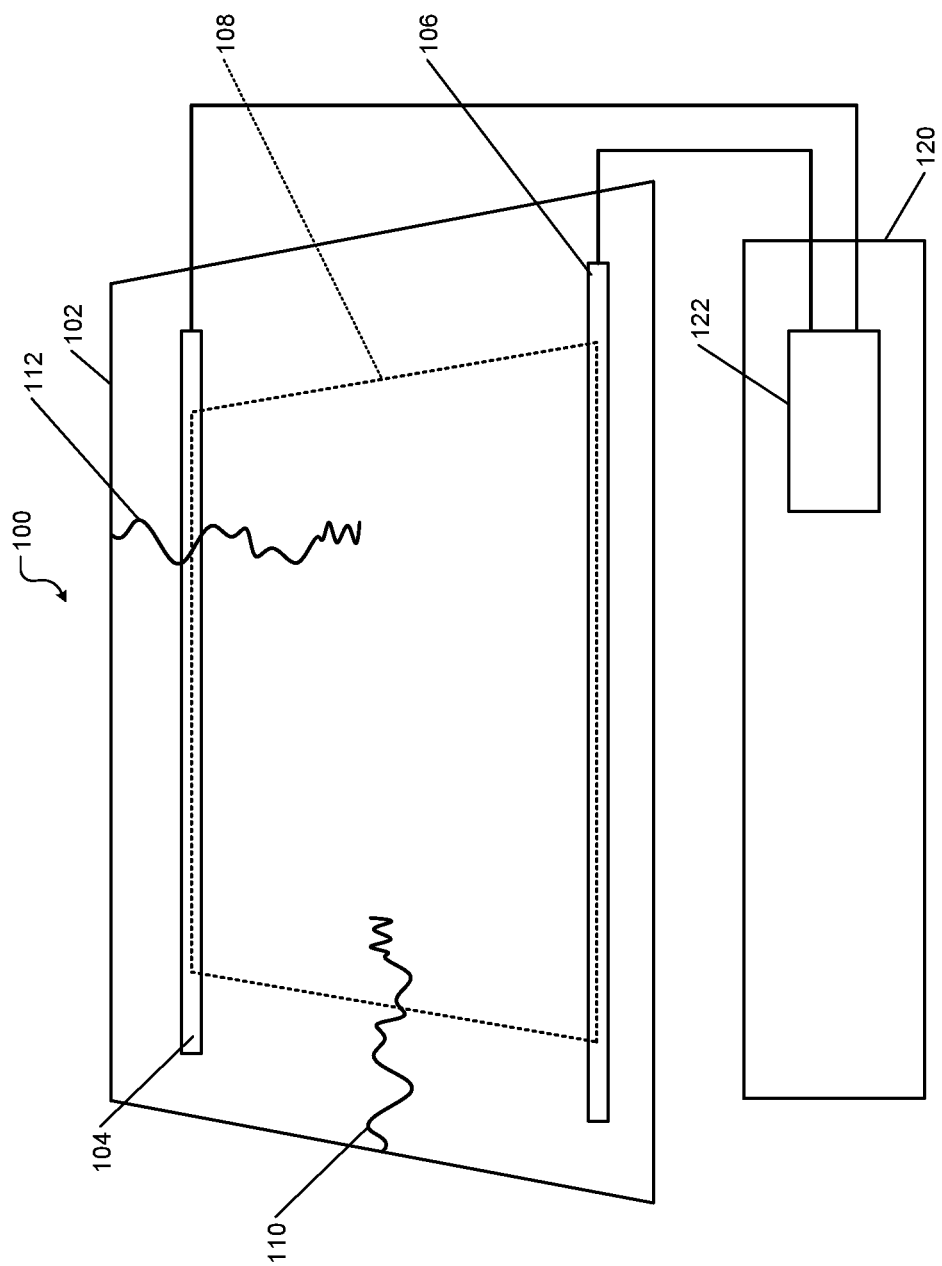
Figure 3:
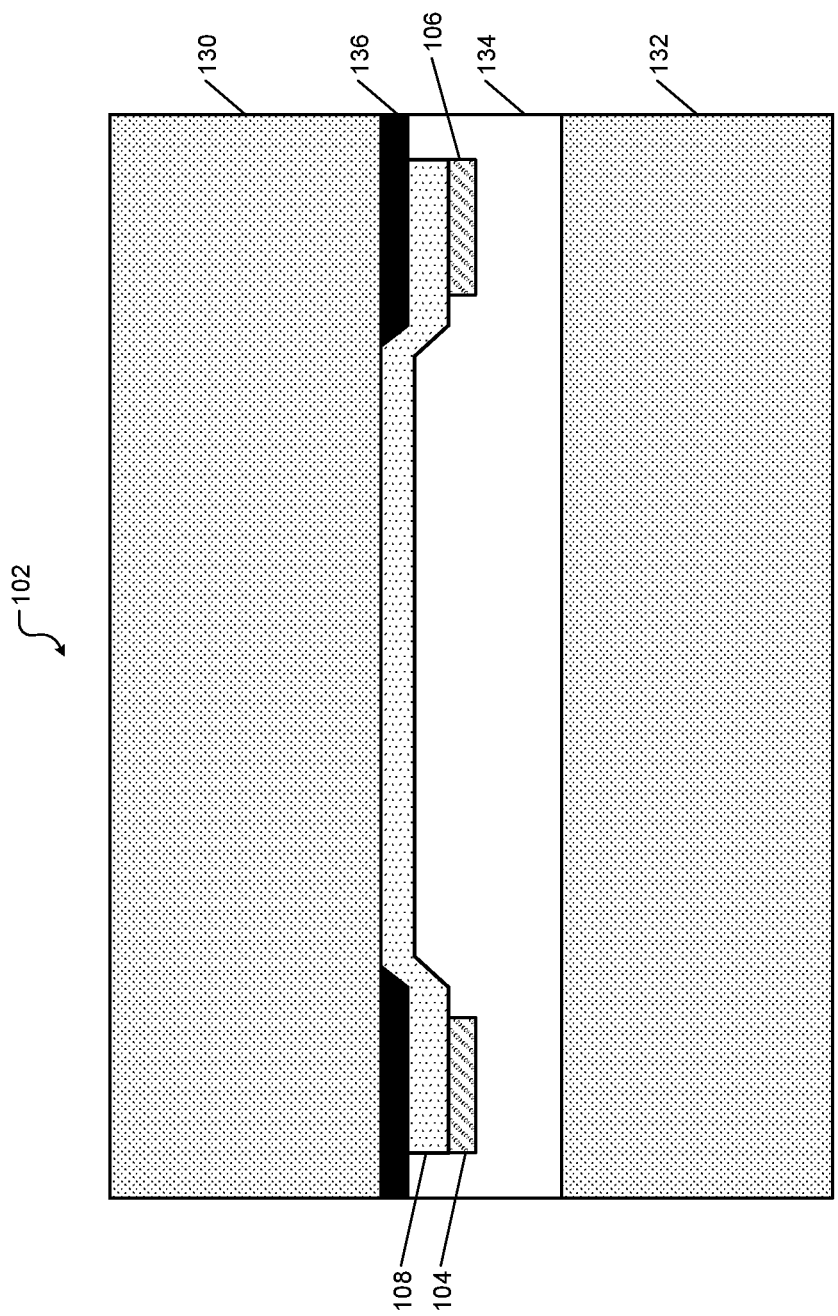
FIG. 3 shows an example of layers of the laminated glass including the primary bus bars, the resistive conductive coating, and a black ceramic enamel printing (also called artwork) that functions as a decorative cover as viewed from outside the vehicle.
Figure 4:
FIG. 4 shows an example of propagation of a crack through the laminated glass and the crack severing a primary bus bar.
Figure 5:
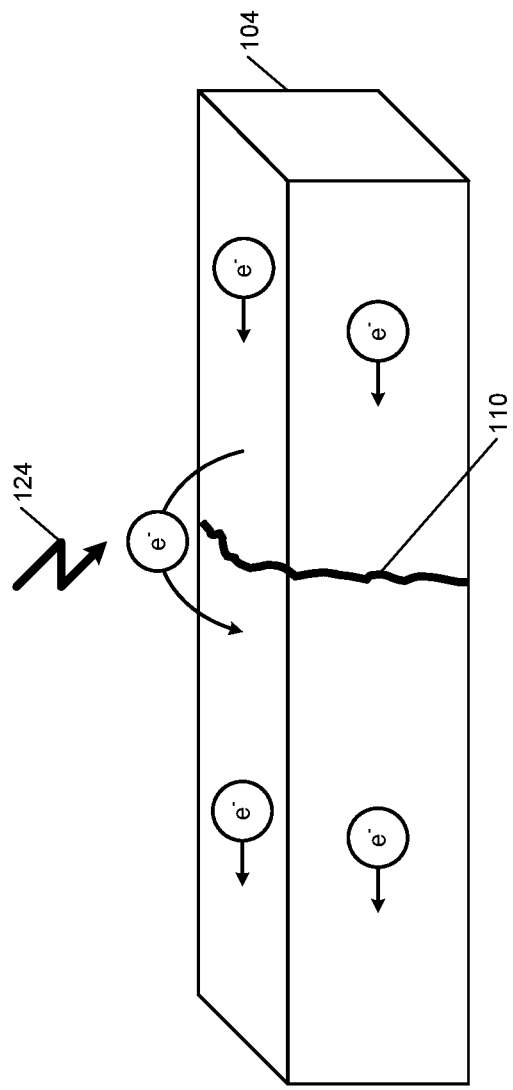
FIG. 5 shows an example of arcing that can be caused due to a primary bus bar severed by a crack in the laminated glass.
Figure 6:
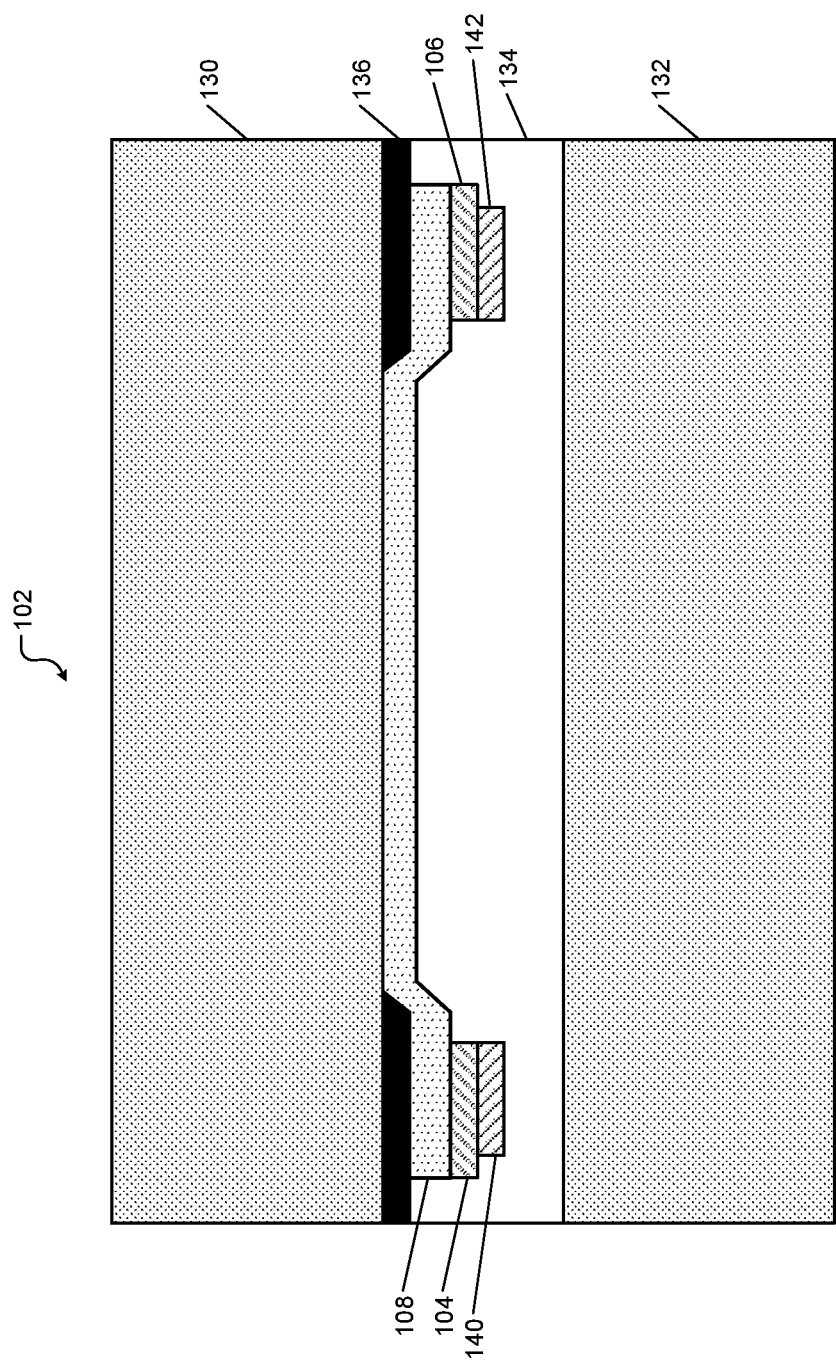
FIG. 6 shows an example of layers of the laminated glass including the primary bus bars, additional secondary bus bars, and the resistive conductive coating bonded to the glass.
Figure 7:
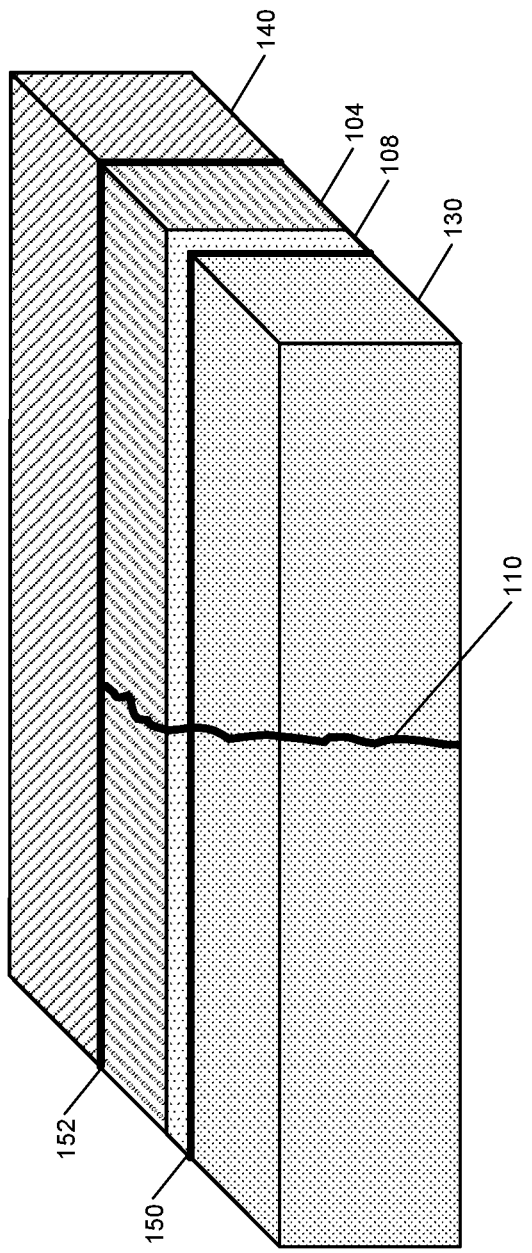
FIG. 7 shows an example of propagation of a crack through the laminated glass and the crack severing a primary bus bar but not severing a corresponding secondary bus bar.
Figure 8:
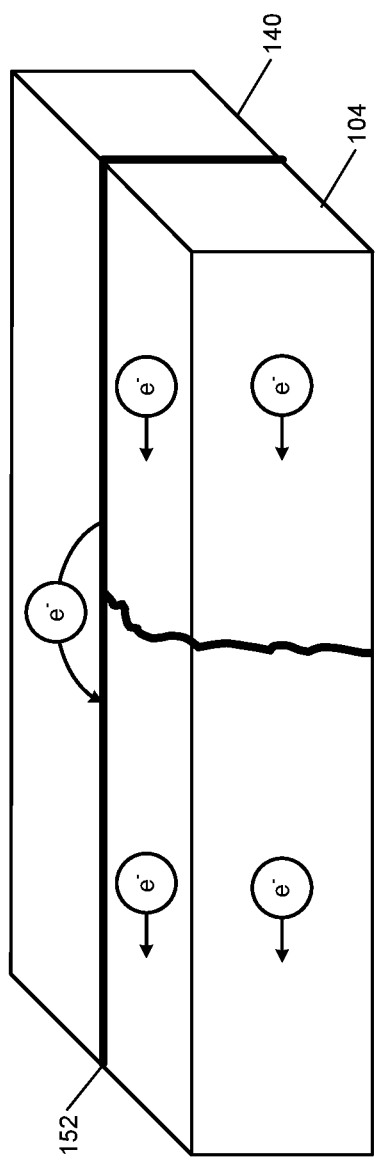
FIG. 8 shows an example of an alternate path for current flow provided by a secondary bus bar while a primary bus bar is severed by a crack in the laminated glass.
Figure 9:
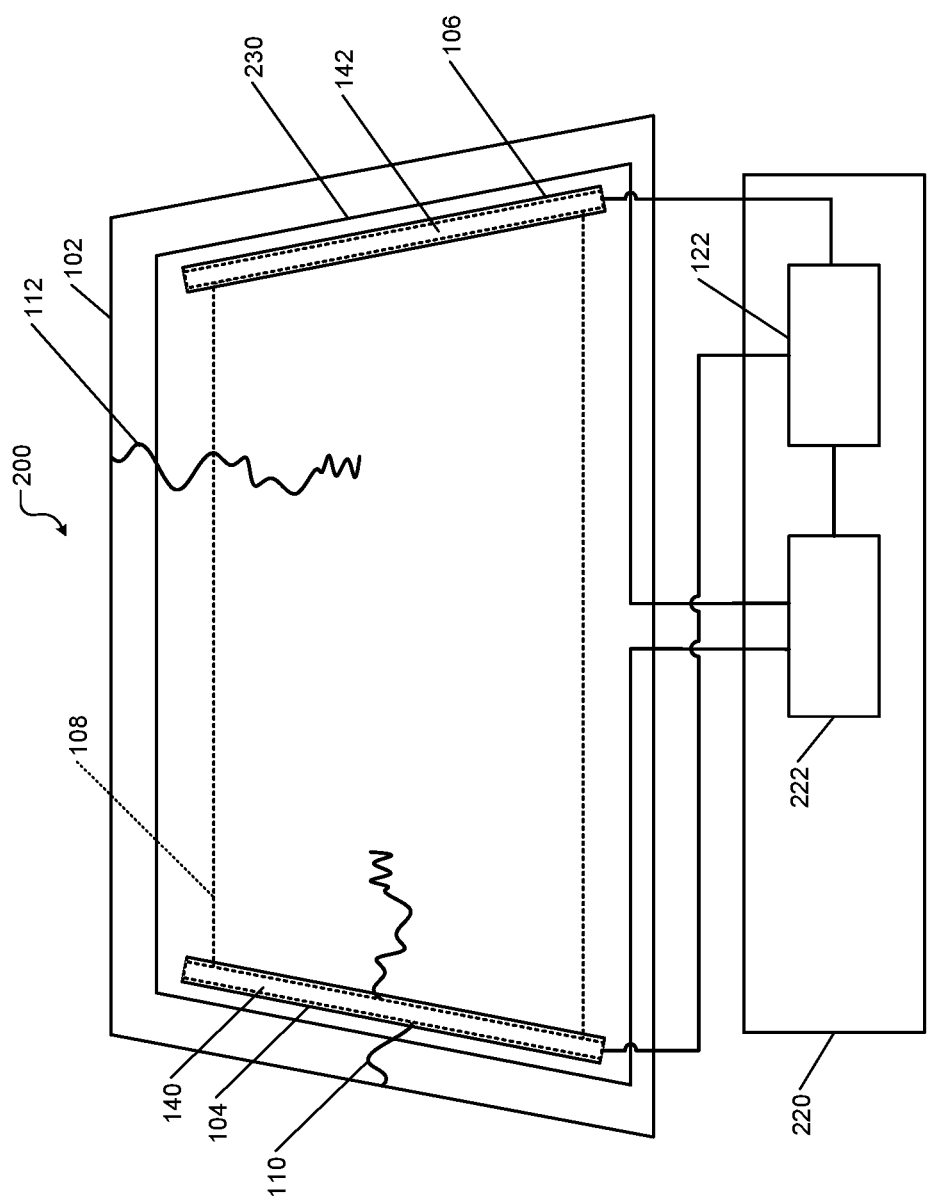
FIGS. 9 and 10 show examples of a heating system comprising a laminated glass including the primary and secondary bus bars, the resistive conductive coating, and a current loop.
Figure 10:
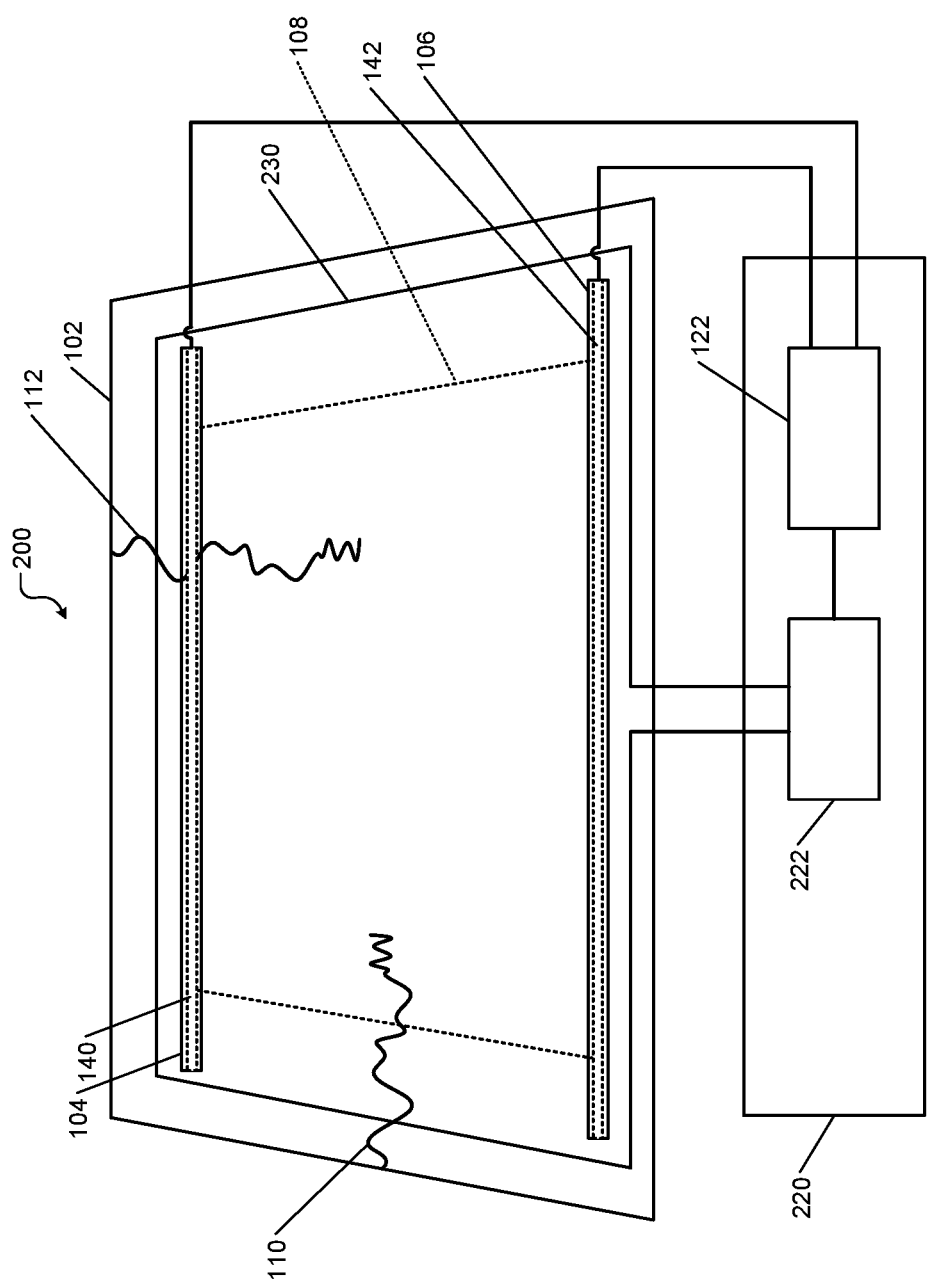
Figure 11:
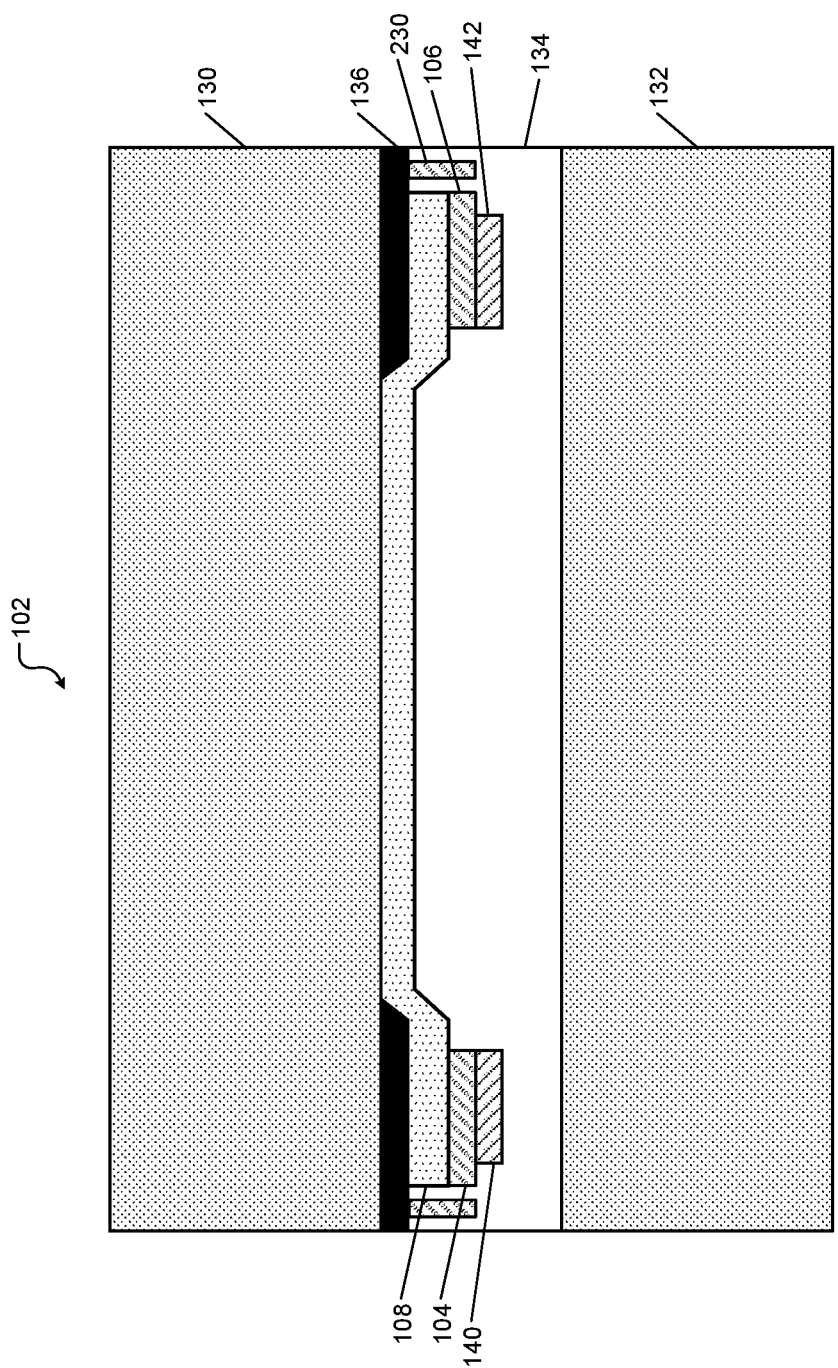
FIG. 11 shows an example of layers of the laminated glass including the protective layer with the primary and secondary bus bars, the resistive conductive coating, and the current loop covered by the protective layer and bonded to the glass.

The present disclosure is organized as follows. FIGS. 1 and 2 show examples of a heating system comprising a laminated glass with the primary bus bars and the resistive conductive coating and without the secondary bus bars and the current loop. FIG. 3 shows the layers of the laminated glass including the protective layer and with the primary bus bars and the resistive conductive coating bonded to the glass and then covered by the protective layer in detail. FIG. 4 shows crack propagation through the primary bus bars. FIG. 5 shows arcing due to a primary bus bar severed by a crack in the laminated glass. FIG. 6 shows the layers of the laminated glass including the protective layer and with the primary and secondary bus bars and the resistive conductive coating covered by the protective layer in detail. FIG. 7 shows crack propagation through the primary bus bars but not through the secondary bus bars. FIG. 8 shows an alternate path for current flow provided by a secondary bus bar in the presence of a primary bus bar severed by a crack in the laminated glass. FIGS. 9 and 10 show examples of a heating system comprising a laminated glass with the primary and secondary bus bars, the resistive conductive coating, and the current loop bonded to the laminated glass. FIG. 11 shows the layers of the laminated glass including the protective layer and with the primary and secondary bus bars, the resistive conductive coating, and the current loop covered by the protective layer in detail.

FIGS. 1 and 2 show examples of a heating system 100 comprising a laminated glass 102 and a controller 120. The laminated glass 102 includes bus bars (hereinafter called a first set of electrodes, primary bus bars, or primary electrodes) 104, 106 and a resistive conductive coating 108. The resistive conductive coating 108 is connected between the primary electrodes 104, 106. The resistive conductive coating 108 can be connected between the primary electrodes 104, 106 in various ways and is therefore not shown in detail. FIGS. 1 and 2 show examples of two different ways in which the primary electrodes 104, 106 can be disposed in the laminated glass 102. The following description applies equally to either example. Therefore, FIGS. 1 and 2 are not described separately for brevity.

The laminated glass 102 is shown and described in further detail with reference to FIG. 3. Briefly, the laminated glass 102 comprises a layer of a protective material (e.g., polyvinyl butyral or PVB) that is bonded together between two sheets of glass under heat and pressure. The protective material has properties including but not limited to optical clarity, toughness, and flexibility. Accordingly, the layer of the protective material is called the protective layer, and the laminated glass 102 comprising the two sheets of glass and the protective layer disposed between the two sheets of glass is collectively called a safety glass.

The primary electrodes 104, 106 are made of an electrically conducting material (e.g., silver-ceramic material). The resistive conductive coating 108 is made of a metallic electrically conducting material (e.g., silver) deposited on one of the sheets of the laminated glass 102 by sputter coating or other processes. Subsequently (i.e., after forming the resistive conductive coating 108), a paste of the electrically conducting material is printed and baked on the resistive conductive coating 108 to form the primary electrodes 104, 106. The primary electrodes 104, 106 made of the electrically conducting material are brittle. Consequently, when the laminated glass 102 cracks, the cracks can propagate through the primary electrodes 104, 106 and can sever the primary electrodes 104, 106 and/or the resistive conductive coating 108 as shown and described below with reference to FIG. 4. Examples of cracks are shown at 110 and 112.

The controller 120 comprises a heating circuit 122. For example, the heating circuit 122 comprises a power supply. The heating circuit 122 supplies power to the primary electrodes 104, 106. For example, a switch on a dashboard of the vehicle (not shown) may be used to turn the heating circuit 122 on and off. The switch is connected to the controller 120. The controller 120 senses the on and off state of the switch and controls the heating circuit 122 according to the sensed state of the switch. When power is supplied to the primary electrodes 104, 106, the resistive conductive coating 108 generates heat. The heat thaws ice and evaporates condensation from the laminated glass 102.

FIG. 3 shows an example of a cross-section of the laminated glass 102 in detail. The laminated glass 102 comprises a first (e.g., an outer) sheet of glass 130, a second (e.g., an inner) sheet of glass 132, and a protective layer 134 (e.g., of PVB) disposed between the first and second sheets of glass 130, 132. The protective layer 134 is bonded between two sheets of glass 130, 132 under heat and pressure to form the laminated glass 102. The primary electrodes 104, 106 and the resistive conductive coating 108 are disposed on the inner surface of glass 130, or can be disposed on the inner surface of glass 132 in an alternate construction using the printing and baking processes described above.

A layer 136 of a ceramic material (hereinafter the cover layer 136) is disposed on the inside of the sheet of glass 130 (or 132 in the alternate construction). The cover layer 136 is generally black in color (therefore also called black enamel), is decorative, and is sintered onto the glass 130 and/or 132. The cover layer 136 covers (i.e., obscures or hides) the primary electrodes 104, 106 and the connections of the resistive conductive coating 108 to the primary electrodes 104, 106. The cover layer 136 also blocks ultraviolet light from the sun. The black enamel (i.e., the cover layer 136) may or may not be used depending on the location of the laminated glass 102 in the vehicle. The cover layer 136 is covered by the protective layer (e.g., of PVB) 134.

FIG. 4 shows an example of propagation of a crack in the laminated glass 102 through the glass 130 or 132 and primary electrodes 104, 106. For example, when the laminated glass 102 cracks, a crack (e.g., the crack 110) in the laminated glass 102 (e.g., in the first or second sheet of glass 130 or 132) and can sever one of the primary electrodes (e.g., the primary electrode 104).

FIG. 5 shows an example of arcing that can occur due to a severed primary electrode (e.g., the primary electrode 104). Arrows in FIG. 5 show the direction of current flow. For example, when the heating circuit 122 (shown in FIG. 1) supplies power to the primary electrodes 104, 106 after the laminated glass 102 cracks, arcing 124 can occur where the primary electrode (e.g., the primary electrode 104) is severed by the crack (e.g., the crack 110). Water can seep in the crack 110 and can exacerbate the arcing. The arcing 124 can heat the area around the crack 110 to high temperatures, which can melt the protective layer 134.

FIG. 6 shows secondary bus bars (hereinafter a second set of electrodes, secondary bus bars, or secondary electrodes) 140, 142 disposed on primary electrodes 104 and 106. The secondary electrodes 140, 142 are made of a different electrically conducting material than the primary electrodes 104 and 106. The electrically conducting material used for the secondary electrodes 140, 142 is more ductile than the electrically conducting material used for the primary electrodes 104 and 106. For example, the electrically conducting material used for the secondary electrodes 140, 142 has a lower Young's modulus than the electrically conducting material used for the primary electrodes 104 and 106. For example, the electrically conducting material used for the secondary electrodes 140, 142 comprises a metallic material such as a foil of aluminum or tin coated copper. The secondary electrodes 140, 142 are electrically connected (e.g., soldered) to the primary electrodes 104, 106, respectively. Therefore, when one of the primary electrodes 104, 106 is severed by a crack in the laminated glass 102, the secondary electrodes 140, 142, which are not severed by the crack in the laminated glass 102, can continue to supply power to the resistive conductive coating 108.

FIG. 7 shows an example of propagation of a crack in the laminated glass 102 that can sever the primary electrodes but does not sever the secondary electrodes as explained below. Specifically, a sintered fit 150 is typically used between the first sheet of glass 130 and the primary electrodes 104, 106. In contrast, a compression fit and/or intermittent soldering 152 is used between the primary electrodes 104, 106 and the secondary electrodes 140, 142. Consequently, when the laminated glass 102 cracks, a crack (e.g., the crack 110) in the laminated glass 102 (e.g., in the first sheet of glass 130) propagates through sintered fit 150 and can sever one of the primary electrodes (e.g., the primary electrode 104). However, the crack 110 does not sever the corresponding secondary electrode (e.g., the secondary electrode 140) since the secondary electrodes 140, 142 are more ductile than the primary electrodes 104, 106. The crack 110 does not sever the secondary electrode (e.g., the secondary electrode 140) also due to the compression fit and/or intermittent soldering 152 used between the primary electrodes 104, 106 and the secondary electrodes 140, 142. Instead, the crack 110 terminates at the compression fit and/or intermittent soldering 152 as shown in FIGS. 7 and 8.

FIG. 8 shows that arcing, which can occur due to a severed primary electrode, is eliminated (i.e., does not occur) due to an alternate path for current flow provided by a corresponding non-severed secondary electrode. Arrows in FIG. 8 show the direction of current flow. For example, when the heating circuit 122 (shown in FIG. 1) supplies power to the primary electrodes 104, 106 after the laminated glass 102 cracks, the primary electrode (e.g., the primary electrode 104) can be severed due to the crack (e.g., the crack 110). However, the corresponding secondary electrode (e.g., the secondary electrode 140) provides an alternate path for current flow. Consequently, while the current cannot flow through the severed primary electrode 104, the current flows through the secondary electrode 140, which eliminates arcing. Instead, when one of the primary electrodes 104, 106 is severed by a crack in the laminated glass 102, the secondary electrodes 140, 142, which are not severed by the crack in the laminated glass 102, and which provide alternate paths for current flow, can continue to supply power to the resistive conductive coating 108, which can continue to generate heat.

FIGS. 9 and 10 show examples of a heating system 200 comprising the laminated glass 102 and a controller 220. The laminated glass 102 includes the primary electrodes 104, 106; the resistive conductive coating 108; and the secondary electrodes 140, 142. The resistive conductive coating 108 is connected between the primary electrodes 104, 106. The secondary electrodes 140, 142 are electrically connected to the primary electrodes 104, 106 as described above with reference to FIGS. 3-8. Consequently, the resistive conductive coating 108 is also electrically connected to the secondary electrodes 140, 142. The resistive conductive coating 108 can be connected between the primary electrodes 104, 106 (and between the secondary electrodes 140, 142 due to the electrical connections between the primary electrodes 104, 106 and the secondary electrodes 140, 142) in various ways and is therefore not shown in detail. FIGS. 9 and 10 show examples of two different ways in which the primary electrodes 104, 106 (and the secondary electrodes 140, 142) can be disposed in the laminated glass 102. The following description applies equally to either example. Therefore, FIGS. 9 and 10 are not described separately for brevity.

In addition to the secondary electrodes 140, 142, the heating system 200 comprises a current loop 230. The current loop 230 is disposed as shown and described in further detail with reference to FIG. 11. Briefly, the current loop 230 includes a single conductor made of an electrically conducting material, which can be the same or different electrically conducting material than that used for the primary electrodes 104, 106. The current loop 230 surrounds the primary electrodes 104, 106; the secondary electrodes 140, 142; and the resistive conductive coating 108. The current loop 230 is printed and baked around the primary electrodes 104, 106; the secondary electrodes 140, 142; and the resistive conductive coating 108. The current loop 230 is printed and baked on the outer glass 130 or inner glass 132 or the same glass surface as the heating system (i.e., the primary electrodes 104, 106; the secondary electrodes 140, 142; and the resistive conductive coating 108). The current loop 230 is printed and baked using the same printing and baking processes used for the primary electrodes 104, 106 and/or the resistive conductive coating 108.

When the laminated glass 102 cracks anywhere and in any direction, the crack (e.g., the crack 110 or 112) propagating in any direction through the laminated glass 102 breaks (i.e., severs) the current loop 230. The controller 220 comprises a detection circuit 222 that supplies power to the current loop 230. The detection circuit 222 detects a discontinuity in the current loop 230 caused by the crack (e.g., the crack 110 or 112) that propagates in any direction through the laminated glass 102 and that severs the current loop 230. On detecting the discontinuity in the current loop 230, the heating circuit 122 can disable the heating system 200 (e.g., by disconnecting the power supply to the primary electrodes 104, 106; the secondary electrodes 140, 142; and the resistive conductive coating 108).

In some examples, the heating system 200 can be implemented with the current loop 230 and without the secondary electrodes 140, 142 since arcing can be prevented using the current loop 230 alone. Specifically, arcing can be prevented without using the secondary electrodes 140, 142 and by using only the current loop 230 since the heating circuit 122 can disable the heating system 200 on detecting the discontinuity in the current loop 230 caused by the crack (e.g., the crack 110 or 112) as explained above.

FIG. 11 shows an example of a cross-section of the laminated glass 102 comprising the primary electrodes 104, 106; the secondary electrodes 140, 142; the resistive conductive coating 108; and the current loop 230 in detail. The laminated glass 102 comprises the first (e.g., the outer) sheet of glass 130, the second (e.g., the inner) sheet of glass 132, and the protective layer 134 (e.g., of PVB) disposed between the first and second sheets of glass 130, 132. The primary electrodes 104, 106; the resistive conductive coating 108; the secondary electrodes 140, 142; the resistive conductive coating 108; and the current loop 230 are disposed as shown in FIG. 11 and as described above with reference to FIGS. 6-10. Therefore, the description is not repeated for brevity. Additionally, the cover layer 136 is disposed as described above with reference to FIG. 3, and the description is not repeated for brevity.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between controllers, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of any given controller of the present disclosure may be distributed among multiple controllers that are connected via interface circuits. For example, multiple controllers may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a laminated glass comprising a protective layer disposed between two sheets of glass;
a resistive conductive coating made of a first electrically conducting material disposed on a surface of one of the two sheets of glass facing the protective layer;
a first set of electrodes made of a second electrically conducting material disposed on the resistive conductive coating;
a second set of electrodes made of a third electrically conducting material disposed on the first set of electrodes;
a loop made of a fourth electrically conducting material disposed on the one of the two sheets of glass facing the protective layer wherein the loop surrounds the first and second sets of electrodes and the resistive conductive coating; and
a cover layer disposed on the surface of one of the two sheets of glass facing the protective layer between the surface of one of the two sheets of glass facing the protective layer and a peripheral portion of the resistive conductive coating, the cover layer being made of a ceramic material, the cover layer covering the first and second sets of electrodes and the loop and covering only the peripheral portion of the resistive conductive coating;
wherein the second set of electrodes is electrically connected to the first set of electrodes, respectively; and
wherein the third electrically conducting material of the second set of electrodes is more ductile than the second electrically conducting material of the first set of electrodes.

2. The system of claim 1 further comprising a heating circuit configured to supply power to the first set of electrodes wherein the resistive conductive coating generates heat based on the power supplied to the first set of electrodes.

3. The system of claim 1 further comprising a heating circuit configured to supply power to the first set of electrodes wherein at least one of the second set of electrodes supplies the power to the resistive conductive coating in response to at least one of the first set of electrodes being severed by a crack in the laminated glass.

4. The system of claim 1 further comprising a controller configured to:
supply power to the first set of electrodes wherein the resistive conductive coating generates heat based on the power supplied to the first set of electrodes;
detect a discontinuity in the loop caused by a crack in the laminated glass; and
discontinue the supply of the power in response to detecting the discontinuity in the loop caused by the crack.

5. The system of claim 1 wherein the second set of electrodes has a lower Young's modulus than the first set of electrodes.

6. The system of claim 1 wherein the first set of electrodes is printed and baked on the resistive conductive coating and wherein the second set of electrodes is soldered on the first set of electrodes, respectively.

7. The system of claim 1 wherein the first set of electrodes is printed and baked on the resistive conductive coating, wherein the loop is printed and baked on the one of the two sheets of glass, and wherein the second set of electrodes is soldered on the first set of electrodes, respectively.

8. The system of claim 1 wherein the protective layer is made of a material selected from a group consisting of polyvinyl butyral, ethylene-vinyl acetate, ethylene-methacrylic acid, polyethylene terephthalate, or any combination thereof.

9. The system of claim 1 wherein the first set of electrodes and the loop are made of a different material than the resistive conductive coating.

10. A method comprising:
disposing a resistive conductive coating made of a first electrically conducting material on a surface of one of two sheets of glass of a laminated glass, the surface facing a protective layer disposed between the two sheets of glass;
disposing a first set of electrodes made of a second electrically conducting material on the resistive conductive coating; and
disposing a second set of electrodes made of a third electrically conducting material on the first set of electrodes, respectively, the third electrically conducting material being more ductile than the second electrically conducting material; and
electrically connecting the second set of electrodes to the first set of electrodes, respectively;
disposing a loop made of a fourth electrically conducting material on the one of the two sheets of glass facing the protective layer wherein the loop surrounds the first and second sets of electrodes and the resistive conductive coating; and
disposing a cover layer on the surface of one of the two sheets of glass facing the protective layer between the surface of one of the two sheets of glass facing the protective layer and a peripheral portion of the resistive conductive coating, the cover layer being made of a ceramic material, the cover layer covering the first and second sets of electrodes and the loop and covering only the peripheral portion of the resistive conductive coating.

11. The method of claim 10 further comprising supplying power to the first set of electrodes wherein the resistive conductive coating generates heat based on the power supplied to the first set of electrodes.

12. The method of claim 10 further comprising supplying power to the first set of electrodes wherein at least one of the second set of electrodes supplies the power to the resistive conductive coating in response to at least one of the first set of electrodes being severed by a crack in the laminated glass.

13. The method of claim 10 further comprising:
supplying power to the first set of electrodes wherein the resistive conductive coating generates heat based on the power supplied to the first set of electrodes;
detecting a discontinuity in the loop caused by a crack in the laminated glass; and
discontinuing the supply of the power in response to detecting the discontinuity in the loop caused by the crack.

14. The method of claim 10 further comprising:
printing and baking the first set of electrodes on the resistive conductive coating;
printing and baking the loop on the one of the two sheets of glass; and
soldering the second set of electrodes on the first set of electrodes, respectively.

15. The method of claim 10 wherein the second set of electrodes has a lower Young's modulus than the first set of electrodes and wherein the protective layer is made of a material selected from a group consisting of polyvinyl butyral, ethylene-vinyl acetate, ethylene-methacrylic acid, polyethylene terephthalate, or any combination thereof.

* * * * *